(12) United States Patent
Piccus et al.

(10) Patent No.: US 10,032,204 B2
(45) Date of Patent: Jul. 24, 2018

(54) SYSTEM AND METHOD FOR SYNTHETIC IDEATION

(71) Applicant: CA, Inc., New York, NY (US)

(72) Inventors: Carol Lyn Piccus, Herndon, VA (US); Debra J. Danielson, Skillman, NJ (US); Karen Lee Sleeth, Durham, NC (US); Diane Norris, Canonsburg, PA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/235,676

(22) Filed: Aug. 12, 2016

(65) Prior Publication Data

US 2018/0047080 A1    Feb. 15, 2018

(51) Int. Cl.
G06F 9/44 (2018.01)
G06Q 30/06 (2012.01)
G06F 8/20 (2018.01)

(52) U.S. Cl.
CPC .......... *G06Q 30/0623* (2013.01); *G06F 8/20* (2013.01)

(58) Field of Classification Search
None
See application file for complete search history.

(56) References Cited

U.S. PATENT DOCUMENTS

| 8,522,195 | B2 | 8/2013 | Miloslavsky et al. | |
| 8,712,947 | B2 | 4/2014 | Shanmukh et al. | |
| 9,262,126 | B2 | 2/2016 | Ghaisas | |
| 2012/0159441 | A1* | 6/2012 | Ghaisas | G06F 8/10 717/123 |
| 2012/0197832 | A1 | 8/2012 | Shanmukh et al. | |

OTHER PUBLICATIONS

Creative Problem Solving with SCAMPER, Retrieved on May 6, 2016 at URL https://litemind.com/scamper.
Scamper is a reliable and effective tool for generating product or service innovations, Dated: Apr. 7, 2012; Retrieved from URL at http://www.destination-innovation.com/articles/481.

(Continued)

*Primary Examiner* — Chuck Kendall
(74) *Attorney, Agent, or Firm* — Sage Patent Group

(57) ABSTRACT

A method includes receiving product data relating to a first computer software product, selecting from the product data a set of epics that describe functional aspects of the first computer software product, and generating a product description ontology of the first computer software product from the selected set of epics. Product description ontologies of a plurality of second computer software products are compared to the product description ontology of the first computer software product, and in response, a list of product functions that are missing from the first computer software product but that are relevant to the first computer software product is generated. The list of product functions that are omitted from the first computer software product but that are relevant to the first computer software product is weighted and output as a weighted list. The weighted list may be used as an input to a software development management platform on which the first computer software product is developed.

20 Claims, 5 Drawing Sheets

(56) References Cited

OTHER PUBLICATIONS

Von-Wun Soo et al. "A cooperative multi-agent platform for invention based on patent document analysis and ontology", Expert Systems with Applications, vol. 31, p. 766-775, (2006).
Wikipedia "Neuro-linguistic programming", Retrieved on Aug. 12, 2016 at URL https://en.wikipedia.org/wiki/Neuro-linguistic_programming.
Wikipedia "Ontology engineering", Retrieved on May 6, 2016 from URL https://en.wikipedia.org/wiki/Ontology_engineering.

* cited by examiner

SYSTEM AND METHOD FOR SYNTHETIC IDEATION

BACKGROUND

Various embodiments described herein relate to computer software, and in particular to systems and methods for computer software development.

Businesses are continuously seeking to generate new ideas for products and services. These may include ideas for new products and services as well as new ideas for existing products and services. The generation of new ideas for products and services can be thought of as a problem solving exercise. For example, the generation of new ideas for products and services can be cast as the problem of how to improve existing products and services.

Businesses have developed formalized approaches for solving problems. For example, one simplistic formal process for problem solving is brainstorming. However, more complex problem solving techniques have been developed. For example, the SCAMPER technique can be used to generate creative ideas for developing new products or improving existing products. SCAMPER is an acronym that stands for Substitute, Combine, Adapt, Modify, Put to another use, Eliminate and Reverse. Each of these verbs is a prompt that encourages the participant to ask questions about existing products through a structured process. "Substitute" prompts the participant to identify a product or feature that can be substituted for an existing product or feature. "Combine" prompts the participant to combine one product or feature with another product or feature. "Adapt" prompts the participant to identify ideas from elsewhere that can be used together with an existing product or feature. "Modify" prompts the participant to think of ways to change an existing product or feature. "Put to other uses" prompts the participant to identify other uses to which the product or feature can be applied. "Eliminate" prompts the participant to remove ideas or elements from the product or feature that are not valuable. "Reverse" prompts the participant to rearrange the order of presentation of products or features.

The process of generating new ideas, such as new ideas for products or services, is commonly referred to as "ideation." The ideation process can take many forms. It is usually thought of as a spontaneous or serendipitous process. However, some businesses have begun to apply creative problem solving techniques such as SCAMPER to the ideation process itself. To apply the SCAMPER technique to the generation of new product ideas, product or features, a participant may start with an existing product or service and then apply one of the verbs from the list above. For the verb SUBSTITUTE, participants may brainstorm ways in which they could substitute any part of the product or service or for the entire product or service. Participants generate as many ideas as they can and then move on to the next verb.

As an example of how the SCAMPER verbs could be used for innovation, assume that a participant wished to improve the process of making bicycles. The participants could brainstorm substituting carbon fiber for metal in the bicycle frame or they could adapt automobile disk brakes for use in bicycles. The substitution or adaptation may represent an incremental innovation which improves the functionality of an existing part or a radical innovation that removes an existing part entirely in favor of a substitute.

There are numerous examples of businesses innovating through the SCAMPER techniques of substitution, adaptation, combination, etc. For example, mobile phones have been combined with cameras and MP3 players. Roll-on deodorant packages were adapted from ballpoint pen designs. Restaurants have eliminated table side service to reduce costs. Furniture manufacturers have modified furniture to make it capable of assembly by the consumer. The SCAMPER technique formalizes this process to encourage product and service innovation.

Even with the development of formal approaches, however, the process of ideation remains a human-centric activity which takes significant time and effort to produce results.

SUMMARY

A method includes receiving product data relating to a first computer software product, selecting from the product data a set of epics that describe functional aspects of the first computer software product, and generating a product description ontology of the first computer software product from the selected set of epics. Product description ontologies of a plurality of second computer software products are compared to the product description ontology of the first computer software product, and in response, a list of product functions that are missing from the first computer software product but that are relevant to the first computer software product is generated. The list of product functions that are omitted from the first computer software product but that are relevant to the first computer software product is weighted and output as a weighted list. The weighted list may be used as an input to a software development management platform on which the first computer software product is developed.

Related computer systems and program products are provided.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects described herein are illustrated by way of example and are not limited by the accompanying figures, with like references indicating like elements.

DETAILED DESCRIPTION

Figure 1:
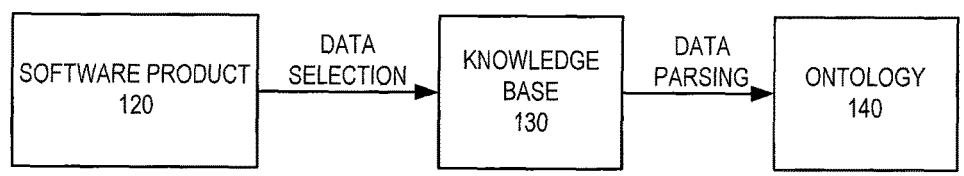
FIG. 1 is a block diagram that illustrates the generation of an ontology from a software product according to various embodiments described herein.

Some embodiments of the inventive concepts provide systems and methods that perform synthetic ideation in the context of generating improvements to features and/or functions of computer software. The synthetic ideation systems and methods described herein can be used to programmatically generate new ideas for generating improvements to features and/or functions of computer software. Some embodiments apply synthetic ideation techniques to product description ontologies associated with computer software products.

An ontology is a formal representation of a set of concepts within a domain and of the relationships between those concepts. Applied ontology is a field of research that seeks to formalize the generation and exploitation of ontologies. In particular, one aspect of ontology engineering relates to techniques for generating an ontology.

A family tree is an example of an ontology. In the case of a family tree, the domain is family, i.e., the set of individuals who are related by family connection. A family tree organizes data within the domain (i.e., the names of family members), in a manner that relates each individual to other individuals within the domain. In particular, a family tree provides a visual representation of the degree of relatedness of any one individual within the domain to any other individual within the domain.

The concept of an ontology can be applied to almost any collection of data that have some degree of relatedness, such as organization charts, libraries, production data, collections of photographs or videos, etc.

In the process of building an ontology, some of the available information can be easily processed by software agents. However, some information is not easily interpretable by software agents. The processing of such information can be improved by adding rich semantics in the form of metadata to the corresponding resources. An example of this is video files. By themselves, video files are difficult to organize. However, metadata associated with the video files, such as a title, description, genre, video length, video format, etc., may be easier to interpret and categorize.

One of the approaches for the formal conceptualization of represented knowledge domains is the use of machine-interpretable ontologies, which provide structured data in, or based on a structured ontology language, such as Web Ontology Language (OWL). Ontology engineering seeks to create ontologies from a list of terms (the vocabulary) using terminological, assertional, and/or relational axioms to define concepts (classes), individuals, and roles (properties). Application areas of ontology engineering include, for example, information retrieval, automated scene interpretation, and knowledge discovery, among others.

Embodiments of the present inventive concepts provide a combination of ontology engineering with automated ideation in a manner that can improve the process of software development. That is, according to some embodiments, ontologies of existing software products are generated. The resulting ontologies are used as inputs to an automated ideation engine, which generates suggestions or proposals for enhancing or extending the functionality of a software product.

FIG. 1 is a block diagram that illustrates the generation of an ontology of features and functions relating to a software product according to various embodiments described herein. As shown in FIG. 1, a knowledge base 130 of information is generated that relates to a software product 120. The knowledge base 130 may comprise a set of epics, which are defined as descriptions of software product features. The epics contain a vocabulary of textual objects that relate to the software product 120. For example, the knowledge base 130 may include a user story that comprises a collection of phrases that describe various features and/or functions of the software product 120. The user story may be generated by selecting data from a functional description of the software product 120, a user manual that describes the software product 120, or any other textual source that describes aspects of the software product 120. The knowledge base 130 may include other data about the software product, such as module lists, headers, configuration data, test cases, feature lists, business processes, rules, or other textual data that describes aspects of the software product 120.

Data in the knowledge base 130 is parsed, for example using automated data parsing or data mining tools, to generate a product description ontology 140. The product description ontology 140 may organize the data in the user story in the form of functions, sub-functions, features and sub-features of the software product 120. Features and functions may be related to one another based on the textual context in which they are presented. The resulting product description ontology 140 contains data about the software product 120 that is arranged in classifications and that describes relationships between the data. That is, the product description ontology comprises a formal representation of product features of the computer software product and their relation to product functions of the computer software product within a domain associated with the computer software product. The data in the knowledge base 130 may be parsed using predetermined parsing rules generated in respect of the software product that is being enhanced. In an implementation, the knowledge bases generated with respect to a plurality of software products may be parsed using the same or similar parsing rules, so that the resulting ontologies can be more easily compared and/or combined. In this manner, a plurality of mutually compatible ontologies may be generated for use in the synthetic ideation systems/methods described in more detail below.

Figure 2:
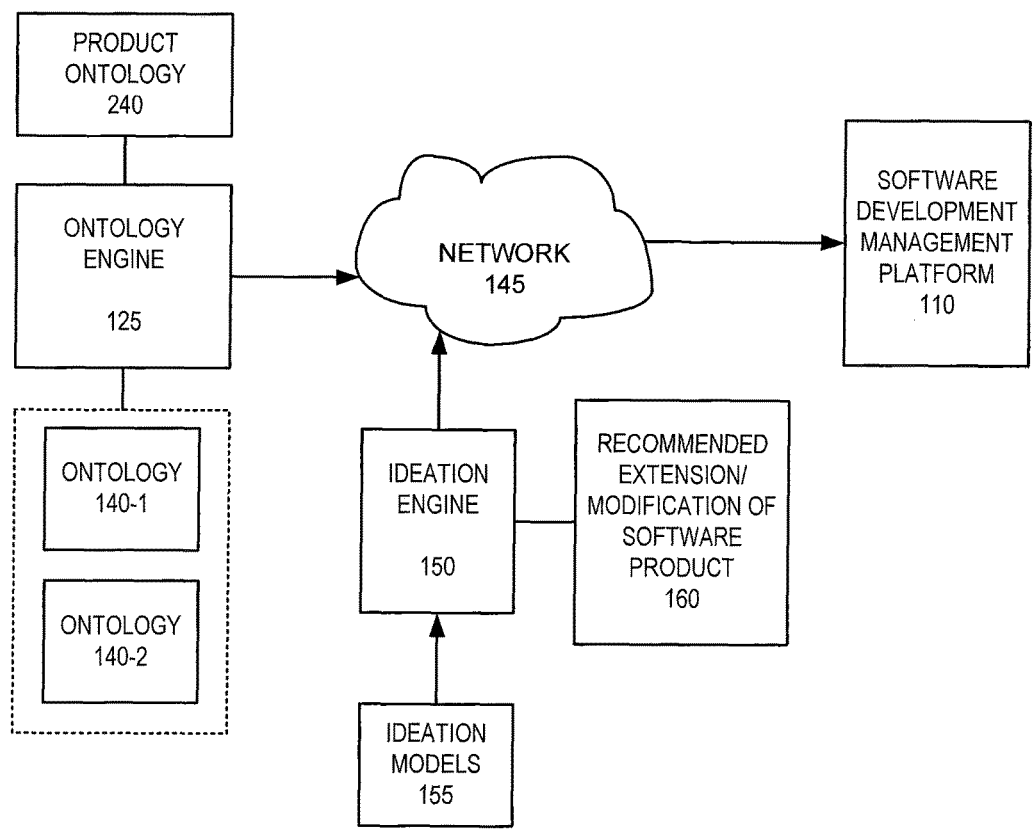
FIG. 2 is a block diagram that illustrates a process of synthetic ideation of extensions/modifications to software products according to various embodiments described herein.

FIG. 2 is a block diagram that illustrates systems/methods for performing synthetic ideation of extensions/modifications to software products according to various embodiments. In particular, an ontology engine 125 is provided that operates to generate ontologies in accordance with the ontology generation process described above with respect to FIG. 1. In particular, ontology engine 125 receives, over an electronic communication network 145, product data relating to a computer software product. The product data includes at least one of feature data, functionality data, user interface data, and/or code metadata relating to the principal computer software product. Product data may in some embodiments be extracted from functional module descriptions, from pseudocode, and/or from source code headers that may contain descriptions of the functional modules. The ontology generation engine 125 selects from the product data a set of epics that describe functional aspects of the first computer software product according to a predefined selection criterion, and generates a product description ontology of the computer software product from the selected set of epics. In some embodiments, the set of epics from the product data comprise arbitrary length clauses that describe aspects of the computer software product.

The predefined selection criterion may include selecting epics containing predefined keywords. The keywords may be defined manually or automatically, for example, by reference to terms extracted from product data. The product description ontology may be generated by creating a hierarchy of product features and product functions related to the product features. In some embodiments, the product description ontology may be generated by applying natural language processing techniques to generate abstracts of the hierarchy of product features and product functions related to the product features.

The ontology engine 125 may be provided in the form of a suitably configured ideation server, or synthetic ideation platform, as described in more detail below. The ontology engine 125 generates a principal product ontology 240 for a principal software product 220 (FIG. 3) that is being enhanced, as well as one or more product description ontologies 140-1, 140-2 for other software products. The other software products may be related to the principal software product in some way, such as by having similar applications, similar developers, similar specifications, etc. In some implementations, the other software products may be largely unrelated to the principal software product. The principal product ontology 240 and the product description ontologies 140-1, 140-2 may be generated in accordance with the ontology generation process described above with respect to FIG. 1.

An ideation engine 150 is connected to the ontology engine 125, such as through a network 145. In an implementation, the network 145 may be a data communication network that utilizes a packet-switched protocol, such as Transmission Control Protocol/Internet Protocol (TCP/IP), to transfer data between nodes. The network may include a wireless network, a wired network, or a combination thereof, and may include, for example, a public network such as the Internet or a private intranet. In other embodiments, the ideation engine 150 may be directly connected to the ontology engine 125, such as through a shared bus, a dedicated link, or a switched link. In some embodiments, the ideation engine 150 and the ontology engine 125 may be implemented as separate modules within a single server or virtual machine.

The ideation engine 150 may be provided in the form of a suitably configured ideation server as described in more detail below. The ideation engine 150 receives from the ontology engine 125 a product ontology 240 corresponding to a software product that is being improved, along with a plurality of product description ontologies 140-1, 140-2 relating to other software products. Although two product description ontologies 140-1, 140-2 are illustrated in FIG. 2, it will be appreciated that any number of ontologies of other software products may be provided to the ideation engine 150 and used in the synthetic ideation process described below depending on the system constraints, including processor capacity, available memory, available processing time, etc.

The ideation engine 150 compares the principal product ontology 240 with the plurality of product description ontologies 140-1, 140-2 and, in response to the comparison, generates a list of product functions that are missing from the principal computer software product 220 but that may be relevant to the principal computer software product 220. The ideation engine 150 weights the list of product functions that are omitted from the principal computer software product 220 but that are relevant to the principal computer software product 220, and outputs the weighted list of product functions that are omitted from the principal computer software product 220 but that are relevant to the principal computer software product 220 as a set of recommended extensions or modifications 160 to the principal computer software product 220. The recommended extensions or modifications 160 to the principal computer software product 220 are transmitted, such as through the network 145, to a software development management platform or process 110 on which the principal computer software product 220 is developed. In this manner, the recommended extensions or modifications 160 to the principal computer software product 220 can be implemented directly into the principal computer software product 220 if desired.

The ideation engine 150 may perform a synthetic ideation process in accordance with one or more ideation models 155. In one example of an ideation model, the product description ontology of the principal computer software product may be compared with the plurality of product description ontologies of the plurality of second computer software products by decomposing the epics contained in the product description ontology of the principal computer software product and the plurality of product description ontologies of the plurality of other computer software products into a plurality of n-grams, and comparing the n-grams of the product description ontology of the principal computer software product with the n-grams of the plurality of product description ontologies of the plurality of other computer software products. An n-gram is a phrase of length n, i.e. an arbitrary length phrase. For example, the epics may be divided into two- or three-word phrases, which can be compared across ontologies.

In an embodiment, a number of times that one of the n-grams appears in the product description ontology of the principal computer software product may be compared with a number of times the n-gram appears in the product description ontologies of the other computer software products and a weight may be assigned in response to the comparison.

In some embodiments, a distance metric may be generated for each n-gram. The distance metric represents a relatedness of the n-gram to the product description ontology of the principal computer software product. The list of product functions that are omitted from the principal computer software product but that are relevant to the principal computer software product may be weighted by generating a relevance metric for each n-gram related to a product functionality in the product description ontologies of the other computer software products. The relevance metric may provide a measurement of the relevance of the n-gram to the principal computer software product.

The product description ontology of the principal computer software product may be combined the product description ontologies of the other computer software products by combining and/or eliminating n-grams from the product description ontology of the principal computer software product and/or the product description ontologies of the other computer software products. In some embodiments, n-grams may be combined and/or eliminated randomly. Randomization may enable the synthetic ideation process to discover previously hidden relationships among the ontologies.

Once a weighted list of product functions has been identified that are omitted from the principal computer software product but that may be relevant to the principal computer software product, the list may be provided to a software product development management platform or process 110 that is responsible for updating the principal computer software product.

In some embodiments, the product description ontology of the principal computer software product may be compared with the product description ontologies of the other computer software products by generating a Heuristic Ideation Technique (HIT) Matrix from the product description ontology of the principal computer software product and the product description ontologies of the other computer software products. An example of the generation of a HIT matrix from product description ontologies is provided below. Other ideation models may be employed by the ideation engine 150.

Figure 3:
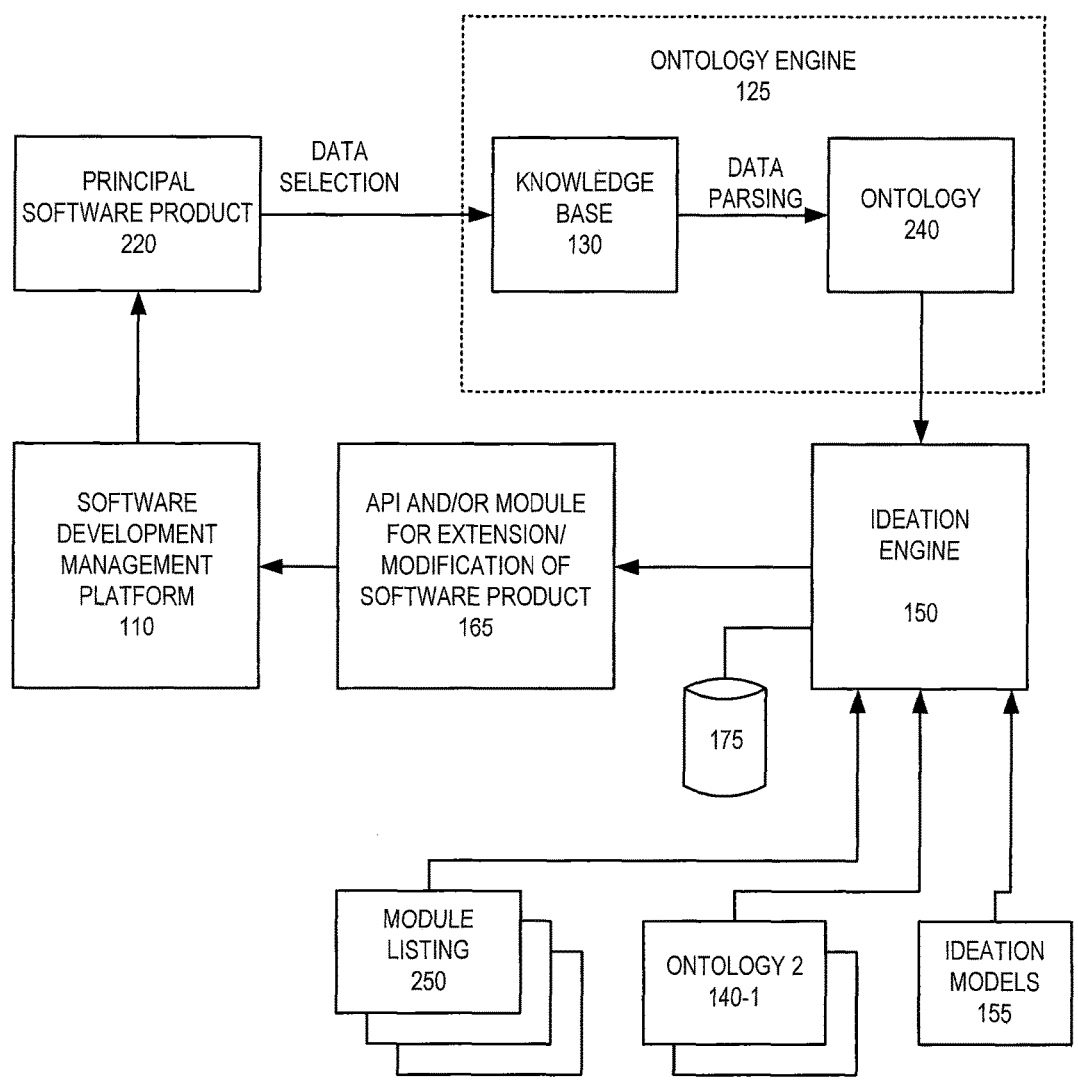
FIG. 3 is a block diagram that illustrates a recursive process of synthetic ideation of extensions/modifications to software products according to various embodiments described herein.

FIG. 3 is a block diagram that illustrates a recursive process of synthetic ideation of application programming interfaces (APIs) and/or modules that can be implemented as extensions and/or modifications to software products according to various embodiments described herein. As shown in FIG. 3, an ontology engine 125 generates a knowledge base 130 of information related to a principal software product 220. As described above, the knowledge base 130 may comprise a set of epics that contain a vocabulary of textual objects that relate to the principal software product 220.

Data in the knowledge base 130 is parsed by the ontology engine 125, for example using automated data parsing or data mining tools, to generate a product description ontology 240 that is specific to the principal software product 220. The resulting product description ontology 240 contains data about the principal software product 220 that is arranged in classifications and that describes relationships between the data. That is, the product description ontology comprises a formal representation of product features of the computer software product and their relation to product functions of the computer software product within a domain associated with the principal computer software product 220.

An ideation engine 150 is connected to the ontology engine 125 and receives the product description ontology for the principal software product 220. The ideation engine further receives a plurality of product description ontologies 140-1, 140-2 that relate to other software products. The product description ontologies 140-1, 140-2 may in some embodiments be provided by the ontology engine 125. However, in some embodiments, the product description ontologies 140-1, 140-2 may be obtained from another source or be retrieved from a data storage 175 that is accessible to the ideation engine 150.

The ideation engine 150 further receives one or more ideation models 155 that define a process of synthetic ideation using the product description ontology 240 and the other product description ontologies 140-1, 140-2. The ideation models, may, for example, include a SCAMPER-based model, a HIT-based model, etc.

The ideation engine may in some embodiments further receive module listings 250 for the principal computer software product and the other computer software products. Although illustrated in FIG. 3 as being provided separately from the product description ontologies 240, 140-1, and 140-2, it will be appreciated that the module listings 250 may be generated as part of the ontology definition process and included as structured data within the product description ontologies.

The ideation engine 150 applies an ideation model 155 to the product description ontology 240 and the other product description ontologies 140-1, 140-2. The ideation model compares the principal product ontology 240 with the plurality of product description ontologies 140-1, 140-2 and, in response to the comparison, generates a list of product functions that are missing from the principal computer software product but that may be relevant to the principal computer software product 220. The ideation engine 150 weights the list of product functions that are omitted from the principal computer software product 220 but that are relevant to the principal computer software product 220, and generates a weighted list of product functions that are omitted from the principal computer software product 220 but that are relevant to the principal computer software product 220 as a set of recommended extensions or modifications 160 to the principal computer software product 220.

The ideation engine then maps the weighted list of product functions that are omitted from the first computer software product but that are relevant to the first computer software product as a set of recommended extensions or modifications 160 to the principal computer software product 220 to the module listings 250 to identify modules in the other computer software products that are associated with the recommended extensions or modifications 160 to identify a set of APIs and/or modules 165. The ideation engine 150 then transmits the identified APIs and/or modules to a software product development management platform or process 110 that is responsible for the development of the principal software product 220. This information may be used by the software product development management platform or process 110 to update or enhance the principal software product in a subsequent development cycle.

In some embodiments, multiple iterations of the cycle illustrated in FIG. 3 may be performed. A different ideation model 155 may be employed by the ideation engine 150 in each cycle. Moreover, in some embodiments, the set of ontologies 140-1, 140-2 relating to other computer software products may be different in different cycles.

Figure 4:
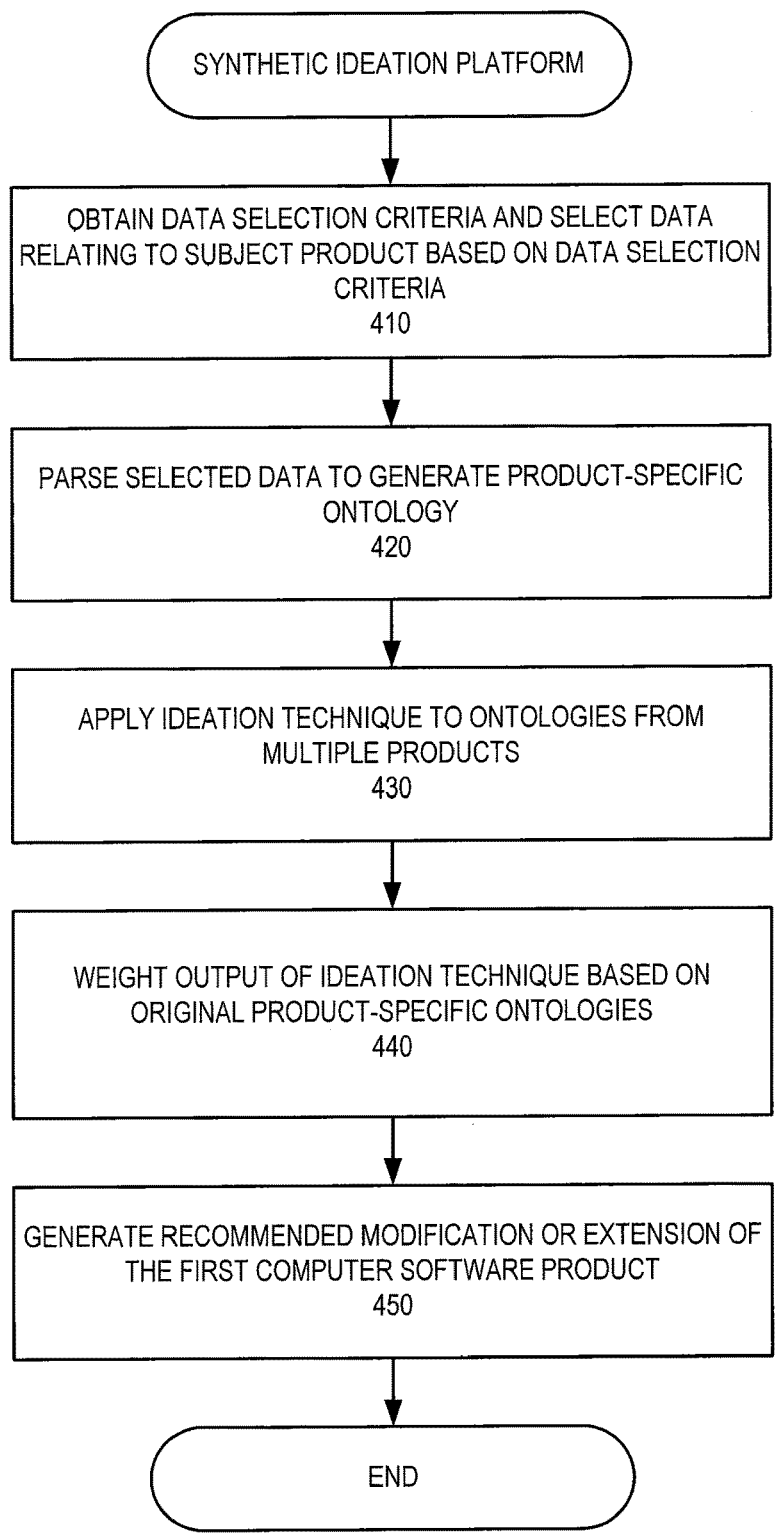
FIGS. 4 and 5 are flowcharts of operations that may be performed according to various embodiments described herein.
Figure 5:
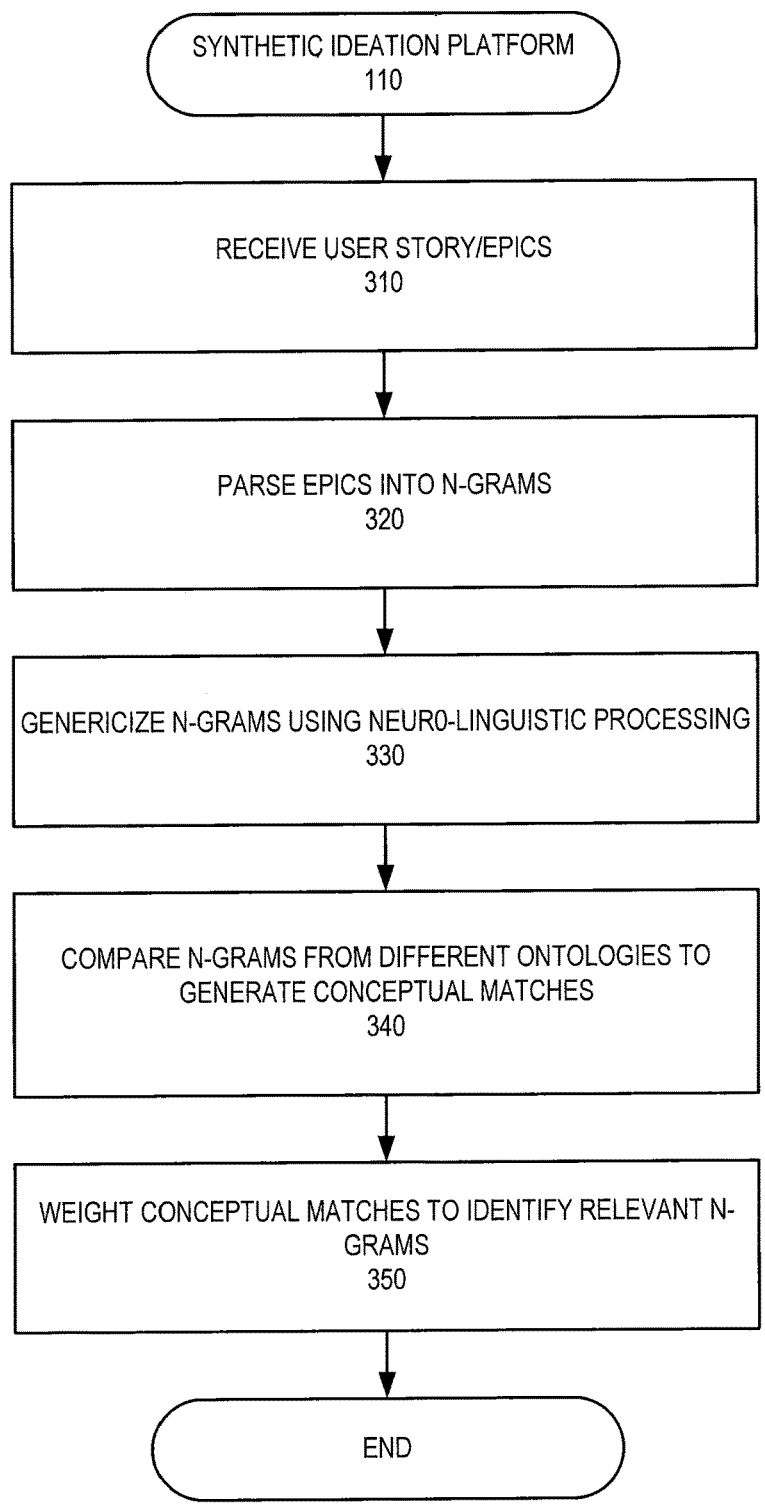

FIGS. 4 and 5 are flowcharts of operations that may be performed according to various embodiments described herein.

Referring to FIG. 4, a process of ontology generation and synthetic ideation using a synthetic ideation platform is illustrated. The process includes obtaining data selection criteria for selecting product data relating to a first computer software product (Block 410). The product data includes at least one of feature data, functionality data, user interface data, and/or code metadata relating to the first computer software product. The method further includes selecting a set of epics from the product data that describe functional aspects of the first computer software product according to the data selection criterion.

The selected data is parsed (Block 420) to generate a product description ontology of the first computer software product from the selected set of epics. One or more product description ontologies that are generated from second computer software products are obtained, and an ideation technique is applied to the product description ontologies from the first computer software product and the second computer software products (Block 430).

In an embodiment, the product description ontology of the first computer software product is compared with the plurality of product description ontologies of the second computer software products. A list of product functions that are missing from the first computer software product but that are relevant to the first computer software product is generated, and the list of product functions that are omitted from the first computer software product but that are relevant to the first computer software product is weighted (Block 440). The weighted list of product functions that are omitted from the first computer software product but that are relevant to the first computer software product is output as a list of recommended modifications or extensions of the first computer software product.

FIG. 5 illustrates an example of the application of a synthetic ideation technique to a set of product description ontologies. To generate a product description ontology for a computer software product, a set of user stories/epics relating to the computer software product is received (Block 310). As a non-limiting example, Table 1 illustrates a set of product description ontologies for a principal computer software product (Product A) and another computer software product (Product B).

TABLE 1

Sample Ontologies

| Product | Epic/User Story | N-grams | N-grams (cont'd) | N-grams (cont'd) | N-grams (cont'd) | N-grams (cont'd) |
|---|---|---|---|---|---|---|
| Product A | Manage workflow: task assignment | Manage workflow (w2 d2) | Workflow task (w4 d2) | Task assignment (w3 d2) | | |
| | Kanban Board: update backlog | Kanban board | Board update | Update backlog | | |
| | Data Roll-ups | Data roll-ups | | | | |
| | Group chat: Discuss, notify, and share in real-time | Group chat | Chat discuss | Discuss notify | Notify share | Share real-time |
| | Enterprise scale: Secure, single sign-on with service level agreements | Enterprise scale | Scale secure | Secure single (w1 d2) | Single sign-on | Sign-on service |
| | (cont'd) | Service level (w1 d2) | Level agreements | | | |
| Product B | Automated Ticket Workflow: task assignment | Automated ticket | Ticket workflow (w2 d1) | Workflow task (w4 d1) | Task assignment (w3 d1) | |
| | Conditional Behaviors for Tasks | Conditional behaviors | Behaviors tasks (w2 d1) | | | |
| | Federated Knowledge Search | Federated knowledge | Knowledge search | | | |
| | Mobility. Single mobile-optimized app for business consumers and power users. | Mobility single (w1 d2) | Single mobile-optimized (w1 d2) | Mobile-optimized app | App business | Business consumers |
| | (cont'd) | Consumers power | Power users | | | |
| | Quick Value Content. Predefined services, instructional guidance, suggested workflows. | Quick value | Value content | Content predefined | Predefined services (w1 d2) | Services instructional (w1 d2) |
| | (cont'd) | Instructional guidance | Guidance suggested | Suggested workflows (w2 d1) | | |

The ontology engine 125 receives a set of user stories/epics (Table 1, column 2) (Block 310) and parses the user stories/epics to form a plurality of n-grams (Table 1, columns 3-7) (Block 320). The ontology engine 125 may then genericize the n-grams using neuro-linguistic processing (Block 330). For example, the ontology engine 125 may scan each n-gram and replace terms in the n-grams with more popular synonyms. The ontology engine 125 may also convert plural terms to singular terms and/or convert words to their roots. Thus, for example, the term "instructional services" may be converted to "instruction service" to facilitate comparison of similar terms.

Previous neuro-linguistic programming (NLP) driven ontology generation and ontology based software engineering approaches seek to generate ontologies of data with similarities and relationships to neighbor ontologies. These concepts are important to creating datasets that will be used in the ideation process. The techniques described herein are unique from these existing concepts, however, in the application of the resulting datasets. In particular, previous techniques use ontologies for the purpose of sharing and re-use of the information. In contrast, the systems and methods described herein use ontologies as inputs into a process that automates the generation of new ideas in software application development in a manner that is more than simply reusing existing developed code.

The n-grams from different ontologies are then compared by the ideation engine 150 (Block 340) to generate conceptual matches. Finally, the conceptual matches are weighted to identify relevant n-grams (Block 350). Weighting may be performed based, for example, on a frequency of occurrence of the n-gram in an ontology or across ontologies. In addition, a distance may be calculated. Table 1 indicates weights and distances for each of the n-grams.

In the example, the distance "d" is calculated by determining how far a word in the n-gram appeared from the initial product (e.g., d1 means that the word does not appear outside Product A's ontology, d2 means that the word appeared in both ontologies). However, this example uses a flat model. For complex software with many modules (which have relationships comparable to those in a family tree), the distance could include the number of branches that must be crossed to get from one occurrence of the word/n-gram to the closest location (outside of the epic). The distance value is then used to help indicate to the user how closely related the output 160 is to the principal software product 220. The distance along with the weight helps to prioritize the output. Additionally, the ideation engine 150 could be configured to automate exclusion of results based on criteria surrounding weight and/or distance measures.

The ideation engine uses the calculated weights and distances to identify features and/or functions associated with the n-grams that do not appear in the first computer software program ontology but that appear to be related to the first computer software program. An example output is illustrated in Table 2, below.

TABLE 2

| | Output of ideation engine | | | | | |
|---|---|---|---|---|---|---|
| | Manage workflow | Workflow task | Task assignment | Kanban board | Board update | Update backlog |
| Automate ticket | Automate ticket manage workflow (M) (Blue) | Automate ticket workflow task (L) (Green) | Automate ticket task assignment (L) (Green) | Automate ticket kanban board | Automate ticket board update | Automate ticket update backlog |
| Ticket workflow | Ticket workflow manage workflow (H) (Blue) | Ticket workflow workflow task (M) (Green) | Ticket workflow task assignment (M) (Green) | Ticket workflow Kanban board (H) (Blue) | Ticket workflow board update (M) (Blue) | Ticket workflow update backlog (M) (Blue) |
| Workflow task | Workflow task manage workflow (M) | SAME (Yellow) | Workflow task task assignment (Yellow) | Workflow task Kanban board (M) (Green) | Workflow task board update (M) (Green) | Workflow task update backlog (M) (Green) |
| Task assignment | Task assignment manage workflow (M) | Task assignment workflow task (Yellow) | SAME (Yellow) | Task assignment Kanban board (M) (Green) | Task assignment board update (M) (Green) | Task assignment update backlog (M) (Green) |
| Quick value | Quick value manage workflow (M) (Blue) | Quick value workflow task (L) (Green) | Quick value task assignment (L) (Green) | Quick value Kanban board | Quick value board update | Quick value update backlog |
| Value content | Value content manage workflow (M) (Blue) | Value content workflow task (L) (Green) | Value content task assignment (L) (Green) | Value content Kanban board | Value content board update | Value content update backlog |
| Content predefined | Content predefined manage workflow (M) (Blue) | Content predefined workflow task (L) (Green) | Content predefined task assignment (L) (Green) | Content predefined Kanban board | Content predefined board update | Content predefined update backlog |
| Predefined services | Predefined services manage workflow (H) (Blue) | Predefined services workflow task (M) (Green) | Predefined services task assignment (M) | Predefined services Kanban board (L) (Blue) | Predefined services board update (L) (Blue) | Predefined services update backlog (L) (Blue) |

TABLE 2-continued

| | Output of ideation engine | | | | | |
|---|---|---|---|---|---|---|
| | Manage workflow | Workflow task | Task assignment | Kanban board | Board update | Update backlog |
| Services instructional | Services instructional manage workflow (H) (Blue) | Services instructional workflow task (M) (Green) | Services instructional task assignment (M) (Green) | Services instructional Kanban board (L) (Blue) | Services instructional board update (L) (Blue) | Services instructional update backlog (L) (Blue) |
| Instructional guidance | Instructional guidance manage workflow (M) (Blue) | Instructional guidance workflow task (L) (Green) | Instructional guidance task assignment (L) (Green) | Instructional guidance Kanban board | Instructional guidance board update | Instructional guidance update backlog |
| Guidance suggested | Guidance suggested manage workflow (M) (Blue) | Guidance suggested workflow task (L) (Green) | Guidance suggested task assignment (L) (Green) | Guidance suggested Kanban board | Guidance suggested board update | Guidance suggested update backlog |
| Suggested workflows | Suggested workflows manage workflow (H) (Blue) | Suggested workflows workflow task (M) (Green) | Suggested workflows task assignment (M) (Green) | Suggested workflows Kanban board (M) (Blue) | Suggested workflows board update (M) (Blue) | Suggested workflows update backlog (M) (Blue) |

Table 2 is a cross-reference of n-grams that indicates relevance of n-gram combination to the first computer software product. Cells labeled "green" represent n-gram combinations that have a high weight but that do not exist in the first computer software product. Cells labeled "blue" represent n-gram combinations that have a medium weight but that do not exist in the first computer software product. Cells labeled "yellow" have already been implemented in the first computer software product. Other ones of the cells may have low relevance to the first computer software product.

Figure 6:
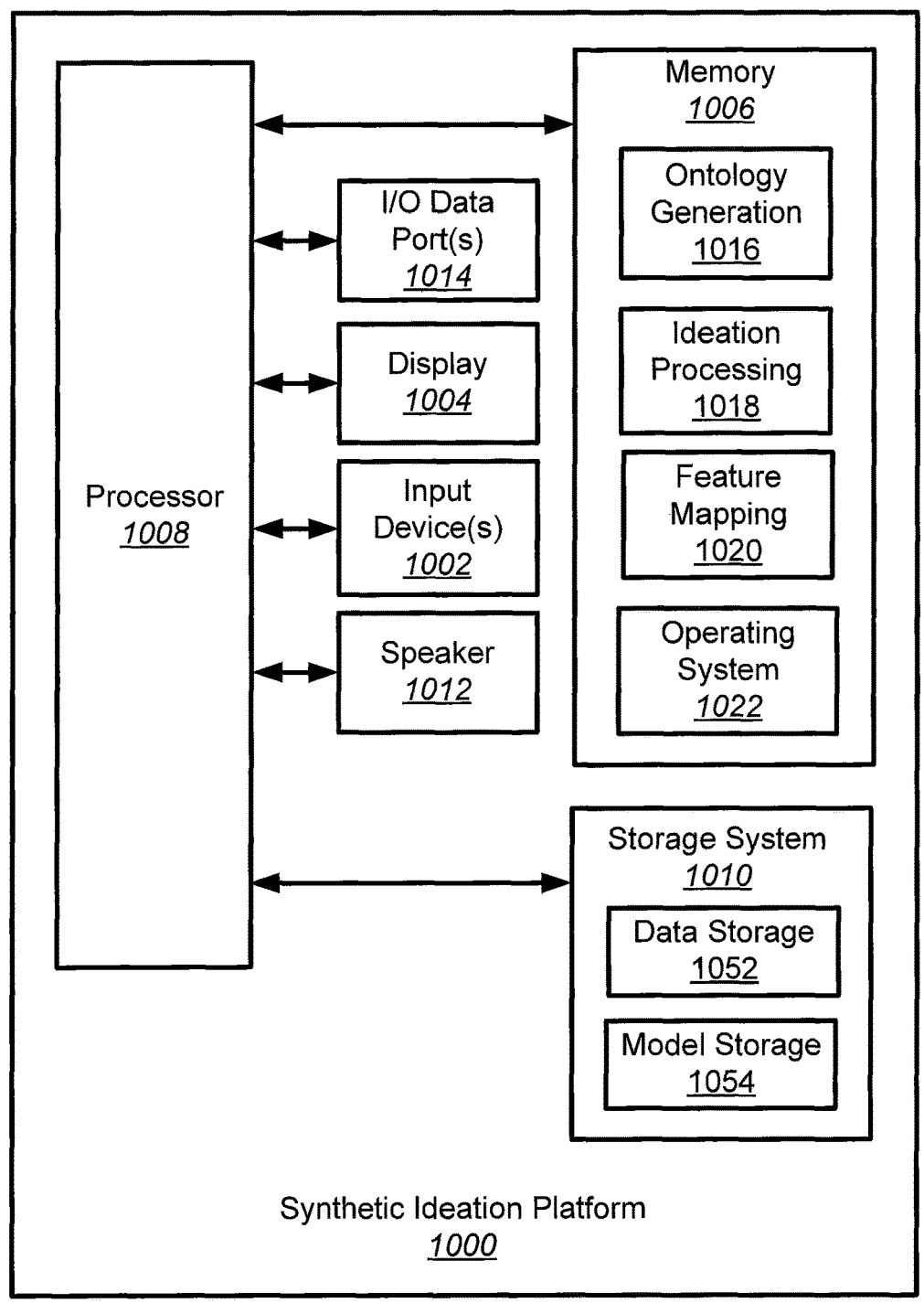
FIG. 6 is a block diagram of a synthetic ideation platform that is configured according to various embodiments described herein.

FIG. 6 is a block diagram of a synthetic ideation platform that is configured according to various embodiments described herein. The synthetic ideation platform 1000 may implement one or both of the ontology engine 125 or the ideation engine 150. The synthetic ideation platform 1000 includes a processor 1008 that communicates with a memory 1006, a storage system 1010, and one or more I/O data ports 1014. The synthetic ideation platform 1000 may also include a display 1004, an input device 1002 and a speaker 1012. The memory 1006 stores program instructions and/or data that configure the thing sourcing platform 1000 for operation. In particular, the memory 1006 may store an ontology generation module 1016, an ideation processing module 1018, a feature mapping module 1020 and an operating system module 1022. The ontology generation module 1016 and ideation module 1018 may be used to instantiate the ontology engine 125 and the ideation engine 150 shown in FIG. 2, respectively, and configure the synthetic ideation platform 1000 to perform the operations described above for such devices. The feature mapping module 1020 may operate to map features of a computer software product to modules of the computer software product as described above.

The storage system 1010 may include, for example, a hard disk drive or a solid state drive, and may store the ontologies 240, 140-1, 140-2 and the ideation models 155 shown in FIG. 2, as well as the knowledge base 130 shown in FIG. 3.

FURTHER DEFINITIONS AND EMBODIMENTS

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

The description herein has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed:

1. A method comprising:
    receiving, over an electronic communication network, at a computing device including a processor and a communication interface coupled to the electronic communication network, product data relating to an existing first computer software product, the product data comprising at least one of feature data, functionality data, user interface data, and/or code metadata relating to the existing first computer software product;
    selecting from the product data a set of epics that describe functional aspects of the first computer software product according to a predefined selection criterion;
    generating a product description ontology of the existing first computer software product from the selected set of epics;
    receiving a plurality of product description ontologies of a plurality of second computer software products;
    comparing the product description ontology of the existing first computer software product with the plurality of product description ontologies of the plurality of second computer software products;
    in response to comparing the product description ontology of the existing first computer software product with the plurality of product description ontologies of the plurality of second computer software products, generating a list of product functions that are missing from the existing first computer software product but that are relevant to the existing first computer software product;

weighting the list of product functions that are omitted from the existing first computer software product but that are relevant to the existing first computer software product; and outputting the weighted list of product functions that are omitted from the existing first computer software product but that are relevant to the existing first computer software product.

2. The method of claim 1, wherein the product description ontology comprises a formal representation of product features of the existing first computer software product and their relation to product functions of the existing first computer software product within a domain associated with the existing first computer software product.

3. The method of claim 1, wherein selecting the set of epics from the product data comprises selecting arbitrary length clauses that describe aspects of the existing first computer software product.

4. The method of claim 1, wherein the predefined selection criterion comprises selecting epics containing predefined keywords.

5. The method of claim 1, wherein generating the product description ontology comprises generating a hierarchy of product features and product functions related to the product features.

6. The method of claim 5, wherein generating the product description ontology comprises applying natural language processing techniques to generate abstracts of the hierarchy of product features and product functions related to the product features.

7. The method of claim 1, wherein comparing the product description ontology of the existing first computer software product with the plurality of product description ontologies of the plurality of second computer software products comprises decomposing the epics contained in the product description ontology of the existing first computer software product and the plurality of product description ontologies of the plurality of second computer software products into a plurality of n-grams, and comparing the n-grams of the product description ontology of the existing first computer software product with the n-grams of the plurality of product description ontologies of the plurality of second computer software products.

8. The method of claim 7, further comprising determining a number of times that one of the n-grams in the product description ontology of the existing first computer software product appears in the product description ontology of the existing first computer software product and in the plurality of product description ontologies of the plurality of second computer software products.

9. The method of claim 7, further comprising generating a distance metric for each n-gram that represents a relatedness of the n-gram to the product description ontology of the existing first computer software product.

10. The method of claim 9, wherein weighting the list of product functions that are omitted from the existing first computer software product but that are relevant to the existing first computer software product comprises generating a relevance metric for each n-gram related to a product functionality in the plurality of product description ontologies of the plurality of second computer software products, wherein the relevance metric represents a relevance of the n-gram to the existing first computer software product.

11. The method of claim 10, wherein comparing the product description ontology of the existing first computer software product with the plurality of product description ontologies of the plurality of second computer software products comprises combining and/or eliminating n-grams from the product description ontology of the existing first computer software product and/or the plurality of product description ontologies of the plurality of second computer software products.

12. The method of claim 11, wherein the combining and/or eliminating n-grams is performed randomly.

13. The method of claim 1, further comprising providing the weighted list of product functions that are omitted from the existing first computer software product but that are relevant to the existing first computer software product to a computer software development process responsible for updating the existing first computer software product.

14. The method of claim 1, wherein comparing the product description ontology of the existing first computer software product with the plurality of product description ontologies of the plurality of second computer software products comprises generating a Heuristic Ideation Technique (HIT) Matrix from the product description ontology of the existing first computer software product and the plurality of product description ontologies of the plurality of second computer software products.

15. The method of claim 1, further comprising:
generating weights associated with relationships between n-grams related to product features of the plurality of second computer software products and n-grams related to product functions of the plurality of second computer software products, wherein comparing the product description ontology of the existing first computer software product with the plurality of product description ontologies of the plurality of second computer software products comprises weighting n-grams related to product features of the existing first computer software product using the generated weights.

16. The method of claim 1, further comprising:
identifying an application programming interface module that is associated with at least one product function that is missing from the existing first computer software product;
supplying the application programming interface module to a software development management platform on which the existing first computer software product is developed; and
modifying the existing first computer software product to include the application programming interface module.

17. A computer program comprising:
a non-transitory computer readable storage medium having computer readable program code embodied in the medium, that is executable to cause a computer system to perform operations comprising:
receiving, over an electronic communication network, at a computing device including a processor and a communication interface coupled to the electronic communication network, product data relating to an existing first computer software product, the product data comprising at least one of feature data, functionality data, user interface data, and/or code metadata relating to the existing first computer software product;
selecting from the product data a set of epics that describe functional aspects of the existing first computer software product according to a predefined selection criterion;

generating a product description ontology of the existing first computer software product from the selected set of epics;

receiving a plurality of product description ontologies of a plurality of second computer software products;

comparing the product description ontology of the existing first computer software product with the plurality of product description ontologies of the plurality of second computer software products;

in response to comparing the product description ontology of the existing first computer software product with the plurality of product description ontologies of the plurality of second computer software products, generating a list of product functions that are missing from the existing first computer software product but that are relevant to the existing first computer software product;

weighting the list of product functions that are omitted from the existing first computer software product but that are relevant to the existing first computer software product; and outputting the weighted list of product functions that are omitted from the existing first computer software product but that are relevant to the existing first computer software product.

18. The computer readable program of claim 17, wherein comparing the product description ontology of the existing first computer software product with the plurality of product description ontologies of the plurality of second computer software products comprises decomposing the epics contained in the product description ontology of the existing first computer software product and the plurality of product description ontologies of the plurality of second computer software products into a plurality of n-grams, and comparing the n-grams of the product description ontology of the existing first computer software product with the n-grams of the plurality of product description ontologies of the plurality of second computer software products.

19. The computer readable program of claim 17, wherein the operations further comprise:

determining a number of times that one of the n-grams in the product description ontology of the existing first computer software product appears in the product description ontology of the existing first computer software product or in the plurality of product description ontologies of the plurality of second computer software products.

20. A computer system comprising:

a processor; and a memory coupled to the processor, the memory comprising computer readable program code embodied therein that is executable to cause the computer system to perform operations comprising:

receiving, over an electronic communication network, at a computing device including a processor and a communication interface coupled to the electronic communication network, product data relating to an existing first computer software product, the product data comprising at least one of feature data, functionality data, user interface data, and/or code metadata relating to the existing first computer software product;

selecting from the product data a set of epics that describe functional aspects of the existing first computer software product according to a predefined selection criterion;

generating a product description ontology of the existing first computer software product from the selected set of epics;

receiving a plurality of product description ontologies of a plurality of second computer software products;

comparing the product description ontology of the existing first computer software product with the plurality of product description ontologies of the plurality of second computer software products;

in response to comparing the product description ontology of the existing first computer software product with the plurality of product description ontologies of the plurality of second computer software products, generating a list of product functions that are missing from the existing first computer software product but that are relevant to the first computer software product;

weighting the list of product functions that are omitted from the first computer software product but that are relevant to the existing first computer software product; and outputting the weighted list of product functions that are omitted from the existing first computer software product but that are relevant to the existing first computer software product.

* * * * *